United States Patent [19]

King, Jr. et al.

[11] Patent Number: 5,556,936
[45] Date of Patent: Sep. 17, 1996

[54] AROMATIC POLYCARBONATES HAVING POLYFUNCTIONAL UV SCREENING UNITS, METHOD FOR MAKING AND USE

[75] Inventors: Joseph A. King, Jr., Niskayuna; Patrick J. McCloskey, Watervliet; Alice M. Colley, Latham; David M. Dardaris, Ballston Spa, all of N.Y.; Luca P. Fontana, Brasschaat, Belgium; Josef G. Berndsen, Rilland, Netherlands

[73] Assignee: General Electric Company, Schenectady, N.Y.

[21] Appl. No.: 341,240

[22] Filed: Nov. 17, 1994

[51] Int. Cl.[6] .................................................. C08G 64/00
[52] U.S. Cl. ............................ 528/199; 428/412; 525/467; 528/196; 528/201; 528/203; 528/204
[58] Field of Search ..................... 428/412; 525/467; 528/196, 199, 201, 203, 204

[56] References Cited

U.S. PATENT DOCUMENTS

| | | | |
|---|---|---|---|
| 4,061,652 | 12/1977 | Schroeter et al. | 548/261 |
| 4,316,033 | 2/1982 | Ching | 548/110 |
| 5,025,083 | 6/1991 | Ueda et al. | 528/199 |
| 5,256,728 | 10/1993 | Dardaris et al. | 524/611 |
| 5,414,057 | 5/1995 | Campbell et al. | 525/462 |

FOREIGN PATENT DOCUMENTS 0614926  9/1994  European Pat. Off. .

OTHER PUBLICATIONS

Gomez, Peter et al. "Functional Polymers" Polymer Bulletin 15, 135–140 (1986).

*Primary Examiner*—James J. Seidleck
*Assistant Examiner*—Terressa Mosley
*Attorney, Agent, or Firm*—William H. Pittman

[57] ABSTRACT

UV stabilized polycarbonates are provided having chemically combined polyhydric phenol benzotriazole carbonate units, such as 1,1-bis(4-hydroxyphenyl)-1-[4-hydroxy-3-(N-2-benzotriazole)phenyl]ethane carbonate units and methods for making. Incorporation of the polyhydric phenol benzotriazole functional units into the polycarbonate backbone can be achieved by redistribution or transesterification under melt polymerization conditions.

3 Claims, No Drawings

AROMATIC POLYCARBONATES HAVING POLYFUNCTIONAL UV SCREENING UNITS, METHOD FOR MAKING AND USE

BACKGROUND OF THE INVENTION

The present invention relates to a melt-transesterification or redistribution process for forming a polycarbonate having chemically combined UV screening units. More particularly, a bisphenol and a diarylcarbonate is melt polymerized with a polyfunctional UV screening monomer such as 1,1-bis(4-hydroxyphenyl)-1-[4-hydroxy-3-(N-2-benzotriazole)phenyl]ethane to provide a polycarbonate having enhanced weathering resistance.

Benzotriazoles have long been recognized for their value as UV screeners when used as part of a silicone top coat as shown for example by U.S. Pat. Nos. 4,061,652 and 4,316,033.

Attempts to directly introduce a benzotriazole compound, such as an aromatic polyhydric phenol having at least one chemically combined benzotriazole group, as a UV screener into a polycarbonate by pelletizing a blend of the benzotriazole compound with the polycarbonate has had limited success. Extrusion can result in a product having the UV screener uniformly dispersed throughout the final resin. The net result is that the UV screener merely functions as a diluent, since most photo-degradation of neat polycarbonate occurs within the first 75–100 μm of the surface. In addition, since the UV screener is merely dispersed in and not chemically bound to the polymer backbone, loss due to juicing, plate-out, miscibility/compatibilization, and volatilization are often major problems or concerns. High weight % incorporation of aromatic polyhydric phenol having at least one chemically combined benzotriazole group via an interfacial synthesis has proven to be impossible, since gellation of the polycarbonate occurs as soon as the concentration of the UV screener exceeds 1 mole percent. A more efficient method for introducing aromatic polyhydric phenol having at least one chemically combined benzotriazole group into polycarbonate is therefor needed.

SUMMARY OF THE INVENTION

The present invention is based on the discovery that an aromatic polyhydric phenol having at least one chemically combined benzotriazole)group, hereinafter referred to sometimes as "UV-screener", such as 1,1-bis(4-hydroxyphenyl)-1-[4-hydroxy-3-(N-2-benzotriazole)phenyl]ethane, can be incorporated into the backbone of a polycarbonate under melt polymerization conditions using melt-transesterification or redistribution technology.

STATEMENT OF THE INVENTION

There is provided by the present invention, a UV stabilized polycarbonate having a molecular weight in the range of from about 2,000 to about 55,000, comprising dihydric phenol carbonate units chemically combined with polyhydric phenol benzotriazole carbonate units, where the polyhydric phenol benzotriazole carbonate units are present in the UV stabilized polycarbonate at from about 2.0 mole percent to about 20 mole percent based on the total moles of dihydric phenol carbonate units and polyhydric phenol benzotriazole carbonate units.

In a further aspect of the present invention, there is provided a method for making a UV stabilized aromatic polycarbonate having from about 2.0 mole percent to about 20 mole percent of chemically combined polyhydric phenol benzotriazole carbonate units, which method comprises melt polymerizing in the presence of an effective amount of a redistribution catalyst, a mixture comprising (A) an aromatic polycarbonate having a molecular weight in the range of from about 36,000 to about 75,000 and consisting essentially of chemically combined aromatic bisphenol carbonate units and (B) an aromatic polyhydric phenol having at least one chemically combined benzotriazole group, where there is used in the melt polymerization mixture, from about 2.0 mole percent to 20 mole percent of the aromatic polyhydric phenol, based on the total moles of aromatic polyhydric phenol and aromatic bisphenol carbonate units.

In an additional aspect of the present invention, there is provided a method for making a UV stabilized aromatic polycarbonate, which method comprises, melt polymerizing in the presence of an effective amount of a melt transesterification catalyst, a mixture comprising (C), a dihydric phenol, (D) a diaryl carbonate, and (E), an aromatic polyhydric phenol having at least one chemically combined benzotriazole)group, where there is utilized in the melt transesterification mixture, based on the total moles of (C), (D), and (E, about 90 to about 98 moles of (C), from about 95 to about 105 moles of (D) and from about 2 to about 20 moles, preferably from about 2 to about 12 moles, of (E).

The preferred UV screener which can be used in the practice of the invention is 1,1-bis(4-hydroxyphenyl)-1-[4-hydroxy-3-(N-2-benzotriazole)phenyl]ethane (THP-BZT). Additional polyhydric phenol benzotriazole UV screeners falling within this class of compounds, are the corresponding 5-substituted benzotriazole moieties, such as the 5-chloro, methyl, ethyl, propyl, butyl, and hexyl.

Diaryl carbonates which can be employed in the practice of the present invention are for example, diphenyl carbonate, di-(halophenyl)carbonates, such as di-(chlorophenyl)carbonate, di-(bromophenyl)carbonate; di-(alkylphenyl)carbonate, such as di-(tolyl)carbonate, di-(ethylphenyl)carbonate, di-(cumyl)carbonate; di-(nitrophenyl)carbonate, or mixtures thereof. Preferably, diphenyl carbonate is used.

Among the aromatic bis hydroxy compounds which can be used in the practice of the present invention are the following compounds:
resorcinol
4-bromoresorcinol
hydroquinone
4,4'-dihydroxybiphenyl
1,6-dihydroxynaphthalene
2,6-dihydroxynaphthalene
bis(4-hydroxyphenyl)methane
bis(4-hydroxyphenyl)diphenylmethane
bis(4-hydroxyphenyl)-1-naphthylmethane
1,1-bis(4-hydroxyphenyl)ethane
1,2-bis(4-hydroxyphenyl)ethane
1,1-bis(4-hydroxyphenyl)-1-phenylethane
2,2-bis(4-hydroxyphenyl)propane ("bisphenol A")
2-(4-hydroxyphenyl)-2-)3-hydroxyphenyl)propane
2,2-bis(4-hydroxyphenyl)butane
1,1-bis(4-hydroxyphenyl)isobutane
1,1-bis(4-hydroxyphenyl)cyclohexane
1,1-bis(4-hydroxyphenyl)cyclododecane
trans-2,3-bis(4-hydroxyphenyl)-2-butene
2,2-bis(4-hydroxyphenyl)adamantane
α,α'-bis(4-hydroxyphenyl)toluene
bis(4-hydroxyphenyl)acetonitrile
2,2-bis(3-methyl-4-hydroxyphenyl)propane
2,2-bis(3-ethyl-4-hydroxyphenyl)propane
2,2-bis(3-n-propyl-4-hydroxyphenyl)propane 2,2-bis(3-isopropyl-4-hydroxyphenyl)propane
2,2-bis(3-sec-butyl-4-hydroxyphenyl)propane
2,2-bis(3-t-butyl-4-hydroxyphenyl)propane2,2-bis(3-cyclohexyl-4-hydroxyphenyl)propane
2,2-bis(3-allyl-4-hydroxyphenyl)propane
2,2-bis(3-methoxy-4-hydroxyphenyl)propane
2,2-bis(3,5-dimethyl-4-hydroxyphenyl)propane
2,2-bis(2,3,5,6-tetramethyl-4-hydroxyphenyl)propane
2,2-bis(3-5-dichloro-4-hydroxyphenyl)propane
2,2-bis(3,5-dibromo-4-hydroxyphenyl)propane
2,2-bis(2,6-dibromo-3,5-dimethyl-4-hydroxyphenyl)propane
α,α-bis(4-hydroxyphenyl)toluene
α,α,α', α'-Tetramethyl-(α,α'-bis(4-hydroxyphenyl)-p-xylene
2,2-bis(4-hydroxyphenyl)hexafluoropropane
1,1-dichloro-2,2-bis(4-hydroxyphenyl)ethylene
1,1-dibromo-2,2-bis(4-hydroxyphenyl)ethylene
1,1-dichloro-2,2-bis(5-phenoxy-4-hydroxyphenyl)ethylene
4,4'-dihydroxybenzophenone
3,3-bis(4-hydroxyphenyl)-2-butanone
1,6-bis(4-hydroxyphenyl)-1,6-hexanedione
ethylene glycol bis(4-hydroxyphenyl)ether
bis(4-hydroxyphenyl)ether
bis(4-hydroxyphenyl)sulfide
bis(4-hydroxyphenyl)sulfoxide
bis(4-hydroxyphenyl)sulfone
bis(3,5-dimethyl-4-hydroxyphenyl)sulfone
9,9-bis(4-hydroxyphenyl)fluorene
2,7-dihydroxypyrene
6,6'-dihydroxy-3,3,3',3'-tetramethylspiro(bis)indane("spirobiindane bisphenol")
3,3-bis(4-hydroxyphenyl)phthalide
2,6-dihydroxydibenzo-p-dioxin
2,6-dihydroxythianthrene
2,7-dihydroxyphenoxathine
2,7-dihydroxy-9,10-dimethylphenazine
3,6-dihydroxydibenzofuran
3,6-dihydroxydibenzothiophene
2,7-dihydroxycarbazole In the practice of the invention, UV screener can be incorporated into the polycarbonate by the above described melt polymerization procedures such as transesterification, or redistribution. Temperatures in the range of from 170° C. to 340° C. can be used. An effective amount of melt transesterification catalyst, or melt redistribution catalyst, such as tetramethylammonium acetate (TMAA) or tetramethylammonium hydroxide (TMAH), is $0.5 \times 10^{-6}\%$ to $5 \times 10^{-2}\%$ by weight, based on the weight of melt polymerization mixture.

Additional polymerization catalysts are any tetraalkyl or tetraaryl basic species, of the corresponding ammonium hydroxides, formates, carboxylates, and acetates, as well as tetraarylphosphonuim, hydroxides, and carboxylates.

Although the above described melt transesterification, or melt redistribution procedures are preferred for making the UV stabilized polycarbonate compositions of the present invention, these UV stabilized polycarbonate compositions can be further melt extruded or down-blended with standard polycarbonate free of UV screener. When down blending, with standard polycarbonate, it is preferred to use a UV stabilized polycarbonates having a loading of at least 4.0 mole percent of chemically combined UV screener units.

In practicing the method of the present invention, additives of all kinds can be added at any stage before, during or after the polymer is melt extruded. In particular instances, the UV stabilized polycarbonate can be used as a protective coating composition on the surface of a polycarbonate substrate. Application of the protective coating can be achieved by coextrusion or by applying the UV stabilized polycarbonate in the form of a solution.

In order that those skilled in the art will be better able to practice the present invention, the following examples are given by way of illustration and not by way of limitation. All parts are by weight unless otherwise indicated. In examples 1–3, there is illustrated the preparation of UV stabilized polycarbonates by melt-transesterication.

EXAMPLE 1

A mixture of 98.6 g (0.432 mol) of 2,2-bis(4-hydroxyphenyl)propane ("bisphenol A") 106.0 g (0.498 mol) of diphenylcarbonate and 7.78 g (0.018 mol) of 1,1-bis(4-hydroxyphenyl)-1-(4-hydroxy-3-(N-2-benzotriazole)phenyl)ethane (UV screener), which provided 6.17 wt % in the final resin, were added under nitrogen to a one liter glass melt polymerization reactor as powders. The reactor vessel with stirrer was immersed in a fluidized heat bath preheated to 180° C. The reaction mixture was allowed to melt, producing a colorless, homogeneous liquid. Upon complete solution, the system was allowed to thermally equilibrate (5–10 min). The solution was stirred at 250 rpm. Into this solution was syringed $3 \times 10^{-4}$ mol of tetramethylammonium hydroxide. The resulting solution was stirred at 180° C. for 5 min. At this time the reaction temperature was raised to 210° C. and the pressure lowered to 175 mm Hg. Phenol began to distill from the reactor immediately (approx. 3–4 drops/sec.). After 35 min, the reactor pressure was lowered to 100 mm Hg. Phenol continued to distill into the receiver flask (1–2 drops/sec.). The reactor temperature was now raised to 240° C. (100 mm Hg) and these conditions maintained for 40 min. During this time period, phenol distilled at an average rate of about 1 drop/3–5sec. The reaction temperature was raised to 270° C. (100 mm Hg) for 20 min. The final reactor stage was to raise the reactor temperature to 300° C. (2 torr) for 55 min then drop the pressure to 0.80 torr for 15 min. At this time the reaction was terminated. A total of 86.2 grams of distillate was collected during the course of the reaction. The essentially colorless melt polycarbonate was collected yielding the following analytical data: $IV_{chloroform}=0.091$, $M_w=3,265$, $M_n=2,000$, $M_w/M_n=1.633$, $M_z=4,901$, and OH=0.86 wt %.

EXAMPLE 2

The procedure of example 1 was repeated, except that there was used 136.8 g (0.600 mol) of BPA, 154.3 g (0.7203 mol) of diphenylcarbonate and 28.77 g (0.0666 mol) of UV screener (16.8 wt % in the final resin). The reaction mixture was allowed to melt, producing a homogeneous liquid upon melting. Upon complete solution, the system was allowed to thermally equilibrate (5–10 min). The solution was stirred at 250 rpm. Into this solution was syringed 680 μL of a 0.221M solution of tetramethylammonium hydroxide and 300 μL of a 0.025M aqueous sodium hydroxide solution. During the final reactor stage, the temperature was raised to 300° C. (0.7–0.8 torr) for 1 h 55 min. At this time at 300° C., the reaction medium began foaming. The reaction was run until the foaming subsided (10 min) and then terminated. A total of 148.4 grams of distillate was collected during the course of the reaction. The torque built rapidly during the forming stage of the last period. The melt polycarbonate was collected yielding the following analytical data: $IV_{chloroform}=0.518$, $M_w=135,054$, $M_n=9,541$, $M_w/M_n=14.154$, $M_z=834,792$, and OH=0.115 wt %.

EXAMPLE 3

The procedure of example 1 was repeated, except that there was used 136.9 g (0.600 mol) of BPA, 138.9 g (0.648 mol) of diphenylcarbonate and 1.29 g (0.00299 mol) of UV screener (0.83 wt % in the final resin) were used. Upon reaction, the reaction mixture was allowed to melt, producing a colorless, homogeneous liquid. The solution was stirred at 250 rpm. Into this solution, there was syringed 680 μL of a 0.221M aqueous solution of tetramethylammonium hydroxide and 300 μL of a 0.025M aqueous solution of sodium hydroxide. During the final reactor stage, the temperature was raised to 300° C. (0.7–0.8 torr) for 1 h 45 min. While heating from 270°–300° C. (288° C.), the reaction medium began foaming. A total of 122.2 grams of distillate was collected during the course of the reaction. The torque built gradually after the foaming stage of the last period. The essentially colorless melt polycarbonate was collected yielding the following analytical data: $IV_{chloroform}=0.490$, $M_w=39,760$, $M_n=15,493$, $M_w/M_n=2.566$, $M_z=67,816$, and OH=0.203 wt %.

As shown by the following table, additional UV stabilized polycarbonates were prepared by essentially following the same melt-transesterification procedure. The UV stabilized resins were further melt-extruded or blended down with standard polycarbonate. In the table, THPE-BZT designates 1,1-bis(4-hydroxyphenyl)-1-(4-hydroxy-3-(N-2-benzotriazole)phenyl)ethane (UV screener)

| Characterization of UV stabilized polycarbonates | | | | | | | |
| --- | --- | --- | --- | --- | --- | --- | --- |
| wt % THPE-BZT | mol % THPE-BZT | IV (dL/g) | Mw | Mn | Mw/Mn | Mz | OH (wt %) |
| 16.90 | 11.0 | 0.518 | 135,054 | 9,541 | 14.145 | 834,792 | 0.115 |
| 8.35 | 5.0 | 0.465 | 53,106 | 12,197 | 4.354 | 142,949 | 0.107 |
| 6.17 | 4.0 | 0.091 | 3,265 | 2,000 | 1.633 | 4,901 | 0.860 |
| 6.17 | 4.0 | 0.096 | 3,895 | 2,165 | 1.799 | 5,267 | 0.780 |
| 4.72 | 2.8 | 0.507 | 58,126 | 14,408 | 4.034 | 149,964 | 0.065 |
| 1.62 | 1.0 | 0.548 | 58,806 | 19,732 | 2.980 | 116,842 | 0.045 |
| 0.83 | 0.5 | 0.490 | 39,760 | 15,493 | 2.566 | 67,816 | 0.203 |

In addition to the above described UV stabilized polycarbonates made by melt-transesterification, additional UV stabilized polycarbonates were made by a redistribution procedure. For example, a UV screener such as THPE-BZT was co-extruded with a standard polycarbonate for example Lexan® polycarbonate made by GE plastics having a $M_w$ of about 49,345 in the presence of an effective amount of tetraethylammonium acetate (TEAA). In general, the catalyst and the UV screener were added to the polymer at room temperature. Prior to extrusion, the mixture was premixed in a Henschel mixer. The extrusions were performed at a barrel set temperature of 260° C. on a W&P 28 mm twin screw extruder. The extrusions were run with vacuum venting (30 inches Hg) to facilitate triethylamine removal resulting from catalyst decomposition. The extrusions were run at a feed rate of 121 lb/hr with screw speeds between 33–325 rpm.

It was found that when extruding polycarbonate having an initial $M_w$ of 49,345 with 0.5 mol % of UV screener, without catalyst, unreacted UV screener (8134 ppm) was detected in the polymer. A methylene chloride/acetone solvent extraction procedure was used. When 300 ppm of TEAA redistribution catalyst was used, unreacted UV screener was not detected. The $M_w$ of the polycarbonate also dropped to 38,902 at the 300 ppm catalyst level.

At UV screener concentrations of 2.0% by weight with a polycarbonate having an initial $M_w$ of 43,471 using 250 ppm of TEAA, a $M_w/M_n$ of 2.79 was obtained; a melt flow of 20 g/10 min was measured on a Tinius-Olsen run at 300° C. using a 1.2 kg weight. A melt flow of 93 g/10 min was obtained with a polycarbonate($M_w$ 29,659) using 5% of UV screener and 250 ppm of TEAA.

Although the above examples are directed to only a few of the many variables to which the present invention is directed, it should be understood that the present invention is directed to the use and preparation of a much broader variety of polycarbonates, UV screeners and UV stabilized polycarbonates as set forth in the description preceding these examples.

What is claimed is:

1. A method for making a UV stabilized aromatic polycarbonate which comprises melt polymerizing, in the presence of an effective amount of a transesterification catalyst, a mixture comprising (C) about 90–98 molar parts of a dihydric phenol, (D) about 95–105 molar parts of a diaryl carbonate and (E) about 2–12 molar parts of 1,1-bis(4-hydroxyphenyl)-1-[4-hydroxy-3-(N-2-benzotriazole)phenyl]ethane.

2. A method in accordance with claim 1, where the dihydric phenol is bisphenol A.

3. A method in accordance with claim 1, where the diaryl carbonate is diphenylcarbonate.

* * * * *